United States Patent
Nakai

(10) Patent No.: US 10,434,730 B2
(45) Date of Patent: Oct. 8, 2019

(54) TREATMENT DEVICE AND TREATMENT METHOD

(71) Applicant: ADWELDS CORPORATION, Fukuoka (JP)

(72) Inventor: Seiya Nakai, Fukuoka (JP)

(73) Assignee: ADWELDS CORPORATION (JP)

(*) Notice: Subject to any disclaimer, the term of this patent is extended or adjusted under 35 U.S.C. 154(b) by 276 days.

(21) Appl. No.: 15/513,024

(22) PCT Filed: Jan. 8, 2016

(86) PCT No.: PCT/JP2016/050554
§ 371 (c)(1),
(2) Date: Mar. 21, 2017

(87) PCT Pub. No.: WO2016/114239
PCT Pub. Date: Jul. 21, 2016

(65) Prior Publication Data
US 2017/0305077 A1    Oct. 26, 2017

(30) Foreign Application Priority Data
Jan. 13, 2015 (JP) .................... 2015-004332

(51) Int. Cl.
*B29C 70/00* (2006.01)
*B29B 15/00* (2006.01)
(Continued)

(52) U.S. Cl.
CPC .............. *B29C 70/50* (2013.01); *B29B 15/12* (2013.01); *B29C 65/08* (2013.01);
(Continued)

(58) Field of Classification Search
CPC ......... B29C 70/00; B29C 70/20; B29C 70/50; B29C 65/00; B29C 65/08; B29C 65/70;
(Continued)

(56) References Cited

U.S. PATENT DOCUMENTS 6,032,342 A    3/2000  Kawabe et al.
6,094,791 A    8/2000  Akase et al.
(Continued)

FOREIGN PATENT DOCUMENTS

CN    102439206 A    5/2012
JP    6-254855 A     9/1994
(Continued)

OTHER PUBLICATIONS

First Office Action dated Dec. 17, 2018 in corresponding Chinese Application No. 201680002086.9.
(Continued)

*Primary Examiner* — Jacob T Minskey
*Assistant Examiner* — Matthew Hoover
(74) *Attorney, Agent, or Firm* — Ostrolenk Faber LLP

(57) ABSTRACT

A technique for stable, high-speed treatment of reinforcement fiber. In a state where a unidirectional fiber bundle is held between a supporting surface of a support and a pressing surface of a resonator ultrasonically vibrating in a pressing direction perpendicular to the supporting surface, a pressed part of the unidirectional fiber bundle pressed by the pressing surface is moved in a longitudinal direction of the unidirectional fiber bundle. By doing so, the unidirectional fiber bundle can be stably treated at high speed when the unidirectional fiber bundle is opened or impregnated with a resin.

12 Claims, 10 Drawing Sheets

(51) Int. Cl.
- *B29C 65/00* (2006.01)
- *B32B 5/00* (2006.01)
- *B32B 27/00* (2006.01)
- *C08J 5/00* (2006.01)
- *D02J 1/00* (2006.01)
- *B29C 70/50* (2006.01)
- *C08J 5/04* (2006.01)
- *D02J 1/18* (2006.01)
- *B29C 65/08* (2006.01)
- *B29C 70/20* (2006.01)
- *B32B 5/10* (2006.01)
- *B32B 27/06* (2006.01)
- *B29C 65/78* (2006.01)
- *B29B 15/12* (2006.01)
- *B29L 9/00* (2006.01)

(52) U.S. Cl.
CPC ...... *B29C 65/7894* (2013.01); *B29C 66/1122* (2013.01); *B29C 66/433* (2013.01); *B29C 66/45* (2013.01); *B29C 66/729* (2013.01); *B29C 66/81821* (2013.01); *B29C 66/8223* (2013.01); *B29C 66/832* (2013.01); *B29C 66/836* (2013.01); *B29C 66/92613* (2013.01); *B29C 70/20* (2013.01); *B32B 5/10* (2013.01); *B32B 27/06* (2013.01); *C08J 5/04* (2013.01); *D02J 1/18* (2013.01); *B29C 66/00441* (2013.01); *B29C 66/69* (2013.01); *B29L 2009/00* (2013.01); *B32B 2250/03* (2013.01); *B32B 2250/40* (2013.01); *B32B 2305/10* (2013.01); *C08J 2300/00* (2013.01)

(58) Field of Classification Search
CPC ... B29C 65/78; B29C 65/789; B29C 65/7894; B29C 66/00; B29C 66/10; B29C 66/11; B29C 66/112; B29C 66/1122; B29C 66/40; B29C 66/43; B29C 66/433; B29C 66/45; B29C 66/70; B29C 66/72; B29C 66/729; B29C 66/80; B29C 66/81; B29C 66/818; B29C 66/8182; B29C 66/81821; B29C 66/82; B29C 66/822; B29C 66/8223; B29C 66/83; B29C 66/832; B29C 66/836; B29C 66/90; B29C 66/92; B29C 66/926; B29C 66/9261; B29C 66/92613; B29B 15/00; B29B 15/10; B29B 15/12; B32B 5/00; B32B 5/10; B32B 27/00; B32B 27/06; C08J 5/00; C08J 5/04; D02J 1/00; D02J 1/10; D02J 1/18

See application file for complete search history.

(56) References Cited

U.S. PATENT DOCUMENTS

| | | | |
|---|---|---|---|
| 9,003,619 B2* | 4/2015 | Kawabe | C08J 5/043 28/283 |
| 10,029,408 B2* | 7/2018 | Nakai | B29C 66/1122 |
| 2011/0114247 A1* | 5/2011 | Lee | B23K 20/10 156/64 |
| 2016/0052194 A1 | 2/2016 | Nakai | |

FOREIGN PATENT DOCUMENTS

| | | |
|---|---|---|
| JP | 10-292238 A | 11/1998 |
| JP | 11-200136 A | 7/1999 |
| JP | 2001-288639 A | 10/2001 |
| JP | 2004-124328 A | 4/2004 |
| JP | 2006-289714 A | 10/2006 |
| JP | 2007-076224 A | 3/2007 |
| JP | 2014-030913 A | 2/2014 |
| WO | WO 97/41285 A1 | 11/1997 |
| WO | WO 2014/168111 A1 | 10/2014 |

OTHER PUBLICATIONS

International Search Report dated Mar. 22, 2016 in corresponding PCT International Application No. PCT/JP2016/050554.
Written Opinion dated Mar. 22, 2016 in corresponding PCT International Application No. PCT/JP2016/050554.
Decision to Grant a Patent dated Dec. 1, 2015 in corresponding Japanese Patent Application No. 2015-004332.
Extended European Search Report dated Jul. 4, 2017 issued in corresponding European Patent Application No. 16737310.9.

* cited by examiner

F I G. 6
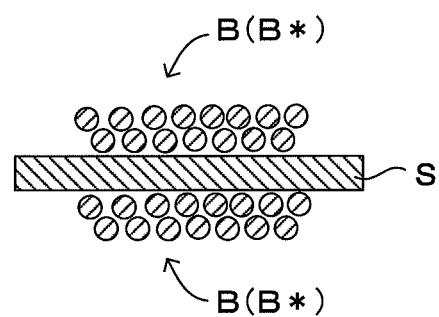

F I G. 1 2
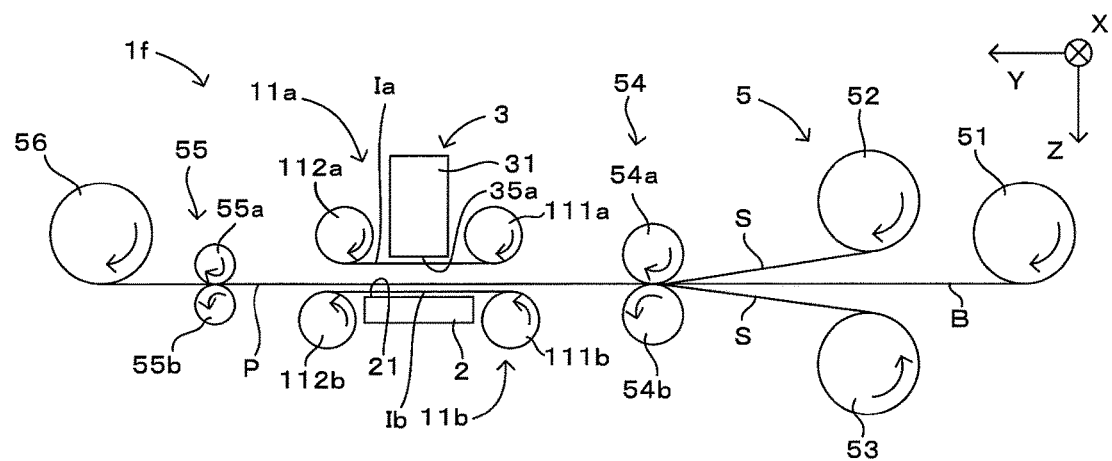

TREATMENT DEVICE AND TREATMENT METHOD

CROSS-REFERENCE TO RELATED APPLICATIONS

The present application is a 35 U.S.C. §§ 371 national phase conversion of PCT/JP2016/050554, filed Jan. 8, 2016, which claims priority to Japanese Patent Application No. 2015-004332, filed Jan. 13, 2015, the contents of both of which are incorporated herein by reference. The PCT International Application was published in the Japanese language.

TECHNICAL FIELD

The present invention relates to a treatment device and treatment method for treating reinforcement fiber.

BACKGROUND ARTS

Heretofore, a unidirectional prepreg has been provided which is fabricated by impregnating a flat band-like unidirectional fiber bundle with a matrix resin. The flat band-like unidirectional fiber bundle is prepared by spreading and opening a unidirectional fiber bundle which is formed by bundling filaments constituting reinforcement fiber such as carbon fiber, glass fiber, and aramid fiber. The matrix resin includes: thermosetting resins such as epoxy resins, and unsaturated polyester resins; and thermoplastic resins such as polyolefin resins, aliphatic polyamide resins, and polyethylene terephthalate resins. In order to form a high-quality unidirectional prepreg, the unidirectional fiber bundle must be opened with high accuracies. In this connection, a variety of techniques for opening the unidirectional fiber bundle have been proposed. For example, Patent Literatures 1 and 2 disclose a technique where the unidirectional fiber bundle is spread widthwise and opened by passing an air flow through the unidirectional fiber bundle while moving the unidirectional fiber bundle in a longitudinal direction. The air flow is passed through the unidirectional fiber bundle in a direction perpendicular to the movement direction of the fiber bundle.

Further, a variety of techniques for impregnating the opened band-like unidirectional fiber bundle with the resin have been proposed. Disclosed in Patent Literature 3, for example, is a technique where the opened band-like unidirectional fiber bundle is impregnated with the resin by applying pressure on the unidirectional fiber bundle overlapped with a resin film by passing them through nip rolls. Further disclosed in Patent Literature 4, for example, is a technique where the unidirectional fiber bundle is impregnated with the resin by passing the opened band-like unidirectional fiber bundle overlapped with the resin film through hot rollers.

CITATION LIST

Patent Literatures

Patent Literature 1: WO 97/41285 (pages 13 to 14, FIG. 2, Abstract, etc.)
Patent Literature 2: JP-A No. H11(1999)-200136 (Paragraph 25, FIG. 1, Abstract, etc.)
Patent Literature 3: JP-A No. 2001-288639 (Paragraphs 0058 to 0060, FIG. 1, etc.)
Patent Literature 4: JP-A No. H10 (1998)-292238 (Paragraph 0053, etc.)

SUMMARY OF INVENTION

Technical Problems

According to the techniques disclosed in Patent Literatures 1 and 2, the unidirectional fiber bundle is spread and opened by applying the air flow. In the fiber opening process, therefore, a strong tension cannot be applied to the unidirectional fiber bundle. This makes it difficult to stably treat the unidirectional fiber bundle at high speed. Further, the impregnation techniques disclosed in Patent Literatures 3 and 4 are faced with a demand for shortening a treatment time where the resin is melted and impregnated into the unidirectional fiber bundle. There is also a demand for a technique for improving a state of bonding between the filaments constituting the reinforcement fiber and the resin during the resin impregnation into the unidirectional fiber bundle.

The invention has been accomplished in view of the above-described problems and has an object to provide a technique for stable, high-speed treatment of the unidirectional fiber bundle.

Solution to Problem

According to an aspect of the invention for achieving the above object, a treatment device for treating reinforcement fiber includes: a support including a supporting surface; a pressure body including a pressing surface; vibration means for applying ultrasonic vibrations to the pressure body in a pressing direction perpendicular to the supporting surface; and movement means for moving a unidirectional fiber bundle relative to the pressure body in a state where the unidirectional fiber bundle as the reinforcement fiber is held between the supporting surface and the pressing surface of the pressure body ultrasonically vibrated by the vibration means in the pressing direction, and has an arrangement wherein the unidirectional fiber bundle is opened while the movement means is moving a pressed part of the unidirectional fiber bundle pressed by the pressing surface in a longitudinal direction of the unidirectional fiber bundle.

According to another aspect of the invention, a treatment method for treating reinforcement fiber has an arrangement wherein in a state where a unidirectional fiber bundle as the reinforcement fiber is held between a supporting surface of a support and a pressing surface of a pressure body ultrasonically vibrating in a pressing direction perpendicular to the supporting surface, the unidirectional fiber bundle is opened in parallel with moving a pressed part of the unidirectional fiber bundle pressed by the pressing surface in a longitudinal direction of the unidirectional fiber bundle.

In this arrangement, the unidirectional fiber bundle can be opened by moving the pressed part of the unidirectional fiber bundle pressed by the pressing surface in the longitudinal direction of the unidirectional fiber bundle in the state where the unidirectional fiber bundle is held between the supporting surface of the support and the pressing surface of the pressure body ultrasonically vibrating in the pressing direction perpendicular to the supporting surface. In comparison with the prior-art technique utilizing the air flow, therefore, the strong tension can be applied to the unidirectional fiber bundle being opened. Thus, the unidirectional fiber bundle can be opened by the stable, high-speed treatment.

According to another aspect of the invention, a treatment device for treating reinforcement fiber includes: a support including a supporting surface; a pressure body including a pressing surface; vibration means for applying ultrasonic vibrations to the pressure body in a pressing direction perpendicular to the supporting surface; and movement means for moving the reinforcement fiber and a resin member relative to the pressure body in a state where the reinforcement fiber overlapped with the resin member is held between the supporting surface and the pressing surface of the pressure body ultrasonically vibrated by the vibration means in the pressing direction, and has an arrangement wherein the reinforcement fiber is impregnated with a resin of the resin member while the movement means is moving a pressed part of the reinforcement fiber pressed by the pressing surface.

According to another aspect of the invention, a treatment method for treating reinforcement fiber has an arrangement wherein in a state where the reinforcement fiber is overlapped with a resin member and held between a supporting surface of a support and a pressing surface of a pressure body ultrasonically vibrating in a pressing direction perpendicular to the supporting surface, the reinforcement fiber is impregnated with a resin of the resin member in parallel with moving a pressed part of the reinforcement fiber pressed by the pressing surface.

In another aspect of the invention, an arrangement may be made wherein the reinforcement fiber is a unidirectional fiber bundle, and in a state where the unidirectional fiber bundle opened into a band-like shape is overlapped with the resin member and held between the supporting surface and the pressing surface, the movement means moves a pressed part of the unidirectional fiber bundle pressed by the pressing surface in a longitudinal direction of the unidirectional fiber bundle.

In another aspect of the invention, an arrangement may be made wherein the reinforcement fiber is a unidirectional fiber bundle, and in a state where the unidirectional fiber bundle opened into a band-like shape is overlapped with the resin member and held between the supporting surface and the pressing surface, a pressed part of the unidirectional fiber bundle pressed by the pressing surface is moved in a longitudinal direction of the unidirectional fiber bundle.

In this arrangement, the resin member can be quickly raised in temperature and melted by applying the ultrasonic vibrational energy to activate the resin molecules to rotate and vibrate for heat generation. In comparison with the prior-art technique utilizing a pressure device such as the nip rollers, therefore, the pressed part of the reinforcement fiber pressed by the pressing surface can be moved at higher speed while the total impregnation time of the impregnation treatment can be reduced by the application of ultrasonic vibrations. Thus, the reinforcement fiber can be impregnated with the melted resin by the stable, high-speed treatment. Further, the application of ultrasonic vibrations permits the pressure body of a compact structure to impregnate the resin into the reinforcement fiber. In comparison with the prior-art technique utilizing the pressure device such as the nip rollers, therefore, the reinforcement fiber can be impregnated with the resin by means of a device having a much more compact structure.

The impregnation treatment is performed by applying the ultrasonic vibrations. Hence, the filaments constituting the reinforcement fiber are vibrated to accelerate a reaction at a bonding interface between the filaments of the reinforcement fiber and the resin so that the resin exhibits a good wetting state on the filaments. Thus, a good bonding state can be established between the filaments and the resin. Thus, the resin of the rein member can be favorably impregnated into the reinforcement fiber, producing very little resin void.

By simultaneously treating the unidirectional fiber bundle before opened and the resin member, it becomes possible to melt the resin member and impregnate the melted resin into the fiber bundle in parallel with opening the unidirectional fiber bundle. In contrast to the prior-art technique, there is no need for providing both a fiber opening device and an impregnation device. Therefore, the treatment cost of the unidirectional fiber bundle can be reduced.

It is further preferred that the treatment device further includes a pressing member for pressing the reinforcement fiber having been impregnated with the resin against the supporting surface.

In this arrangement, the pressing member can maintain a shaped configuration of the reinforcement fiber impregnated with the resin by the application of ultrasonic vibrations from the pressure body. Further, the reinforcement fiber after impregnation treatment can be shaped in a suitable configuration by the pressing member.

It is further preferred that the treatment device further includes cooling means for cooling the pressing member.

In this arrangement, the resin impregnated into the reinforcement fiber can be quickly cooled and hardened by the pressing member cooled by the cooling means.

It is preferred that the pressing member presses the reinforcement fiber having been impregnated with the resin against the supporting surface with a predetermined pressing force.

In this arrangement, the pressing member presses the reinforcement fiber against the supporting surface with such a predetermined pressing force as to be suitable for maintaining the shaped configuration of the reinforcement fiber after impregnation treatment. By doing so, the pressing member can more reliably maintain the shaped configuration of the reinforcement fiber impregnated with the resin. Further, the reinforcement fiber after impregnation treatment is pressed against the supporting surface with a predetermined pressing force previously set according to a target value of the width or thickness of the reinforcement fiber after impregnation treatment. Thus, the width or thickness of the reinforcement fiber after impregnation treatment can be adjusted with high accuracies.

It is further preferred that the pressing member is spaced a predetermined distance from the supporting surface.

In this arrangement, as spaced from the supporting surface by such a predetermined distance as to be suitable for maintaining the shaped configuration of the reinforcement fiber after impregnation treatment, the pressing member presses the reinforcement fiber after impregnation treatment against the supporting surface. By doing so, the pressing member can more reliably maintain the shaped configuration of the resin-impregnated reinforcement fiber. Further, as spaced from the supporting surface by the predetermined distance previously set according to the target value of the thickness or the like of the reinforcement fiber after impregnation treatment, the pressing member presses the reinforcement fiber after impregnation treatment against the supporting surface. Thus, the thickness of the reinforcement fiber after impregnation treatment can be adjusted with high accuracies.

It is preferred that the treatment device further includes heating means for heating the reinforcement fiber before impregnation with the resin.

In this arrangement, the resin can be favorably impregnated into the reinforcement fiber preheated by the heating means.

It is further preferred that the pressing surface presses the reinforcement fiber against the supporting surface with a predetermined pressure.

In this arrangement, the fiber opening or impregnation treatment is performed while pressing the reinforcement fiber with the predetermined pressure previously set according to the thickness of the reinforcement fiber as the treatment object or the target value of the width or the like of the reinforcement fiber after fiber opening or impregnation treatment. Thus, the width of the reinforcement fiber after treatment can be adjusted with high accuracies.

It is further preferred that the pressing surface is spaced from the supporting surface via a predetermined gap therebetween.

In this arrangement, the fiber opening or impregnation treatment is performed in the state where the pressing surface is spaced from the supporting surface via the predetermined gap previously set according to the thickness of the reinforcement fiber as the treatment object or the target value of the thickness or the like of the reinforcement fiber after impregnation treatment. Thus, the thickness of the reinforcement fiber after treatment can be adjusted with high accuracies.

Advantageous Effects of Invention

According to the invention, the reinforcement fiber can be stably treated at high speed by moving the pressed part of the reinforcement fiber pressed by the pressing surface in the state where the reinforcement fiber is held between the supporting surface of the support and the pressing surface of the pressure body ultrasonically vibrating in the pressing direction perpendicular to the supporting surface.

BRIEF DESCRIPTION OF DRAWINGS

FIG. 6 is a transverse sectional view showing unidirectional fiber bundles and a resin sheet which are treated by a treatment device according to a fourth embodiment of the invention;

FIG. 12 is a front view showing a treatment device according to an eighth embodiment of the invention.

DESCRIPTION OF EMBODIMENTS

First Embodiment

Figure 1:
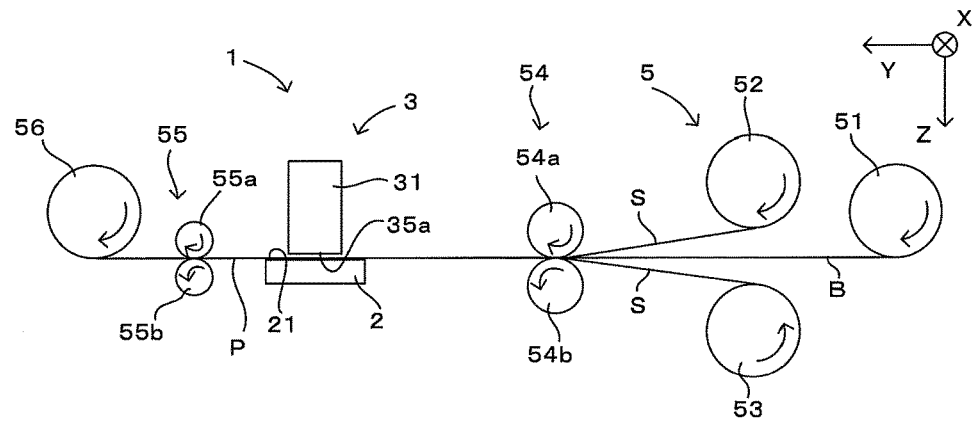
FIG. 1 is a front view showing a treatment device according to a first embodiment of the invention.
Figure 2:
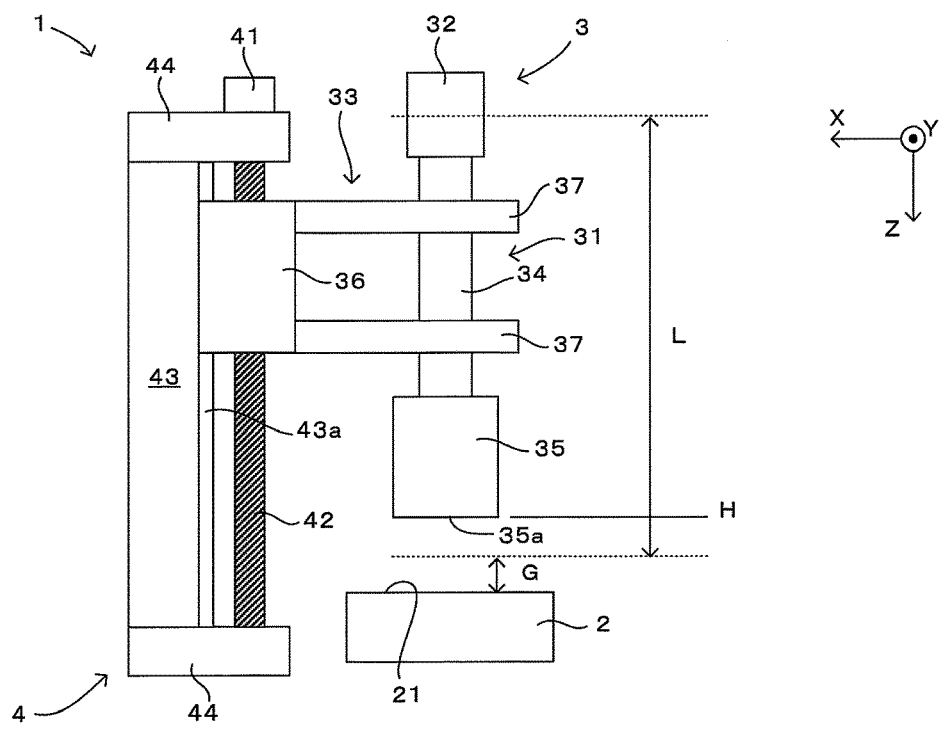
FIG. 2 is an enlarged view of an essential part of the treatment device of FIG. 1 as seen from a left side thereof.
Figure 3:
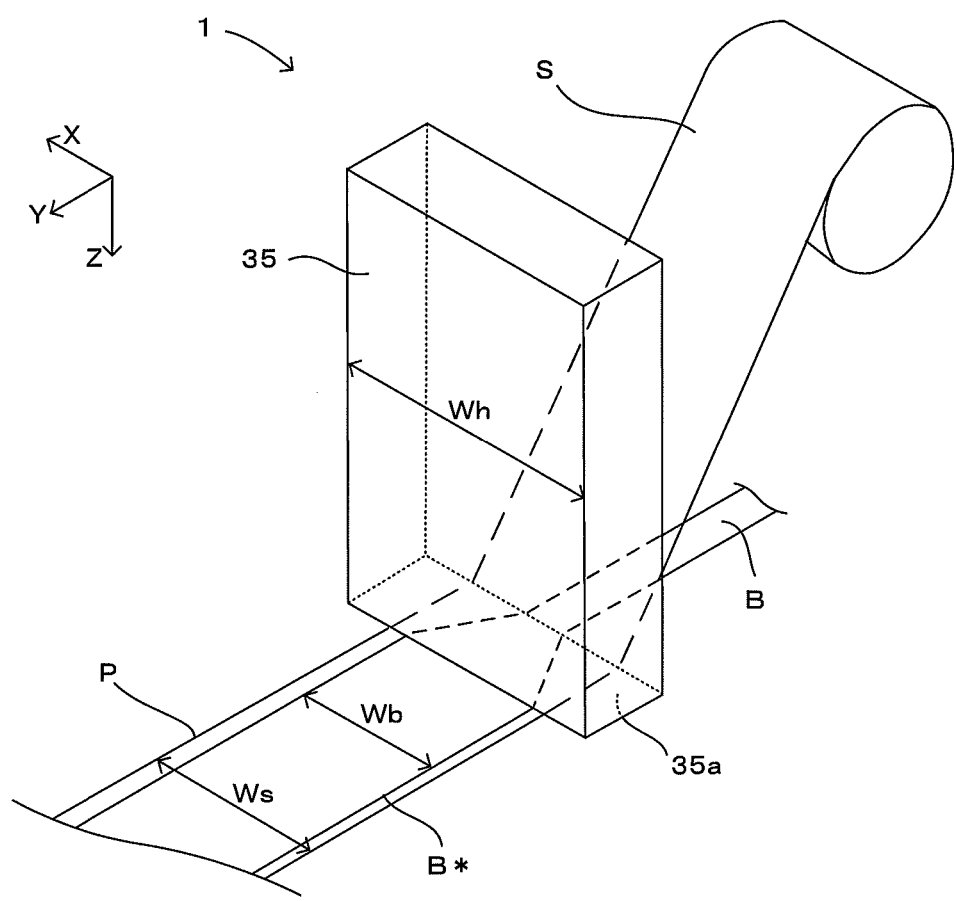
FIG. 3 is a perspective view showing an essential part of FIG. 2.

A treatment device according to a first embodiment of the invention is described with reference to FIG. 1 to FIG. 3. FIG. 1 is a front view showing the treatment device according to the first embodiment of the invention. FIG. 2 is an enlarged view of an essential part of the treatment device of FIG. 1 as seen from a left side thereof. FIG. 3 is a perspective view showing an essential part of FIG. 2. FIG. 3 does not illustrate a resin film S and a support 2 which are disposed on a lower-surface side of a unidirectional fiber bundle B (reinforcement fiber). FIG. 1 to FIG. 3 show only principal components of the invention but do not show the other components for simplicity. Similarly to FIG. 1 to FIG. 3, FIG. 4 to FIG. 12, to be referred to in the subsequent description, show only the principal components. In the following description, such an explanation of the figures is not made.

Treatment Device

A treatment device 1 shown in FIG. 1 and FIG. 2 continuously opens the unidirectional fiber bundle B in a direction of arrow Y or a longitudinal direction thereof, as follows. The unidirectional fiber bundle B is held between a supporting surface 21 of the support 2 and a pressing surface 35a of a horn 35 ultrasonically vibrated in a direction of arrow Z or a pressing direction perpendicular to the supporting surface 21. In this state, the unidirectional fiber bundle B is moved in the longitudinal direction of arrow Y so that a pressed part of the unidirectional fiber bundle B pressed by the pressing surface 35a is moved in the direction of arrow Y or the longitudinal direction of the unidirectional fiber bundle B. In conjunction with the movement of the pressed part, the pressing surface 35a applies the ultrasonic vibrations in the pressing direction of arrow Z to the unidirectional fiber bundle B moved in the direction of arrow Y or the longitudinal direction of the unidirectional fiber bundle B.

The treatment device 1 of this embodiment moves the unidirectional fiber bundle B (resin film S) in the longitudinal direction of arrow Y in a state where the unidirectional fiber bundle B is overlapped with the resin films S (resin member) and placed between the supporting surface 21 and the pressing surface 35a. While doing so, the treatment device opens the unidirectional fiber bundle B in parallel with applying the ultrasonic vibrations for melting the resin films S overlapped on the respective sides of the unidirectional fiber bundle B and impregnating the resin into the unidirectional fiber bundle B. Therefore, a unidirectional prepreg is formed by the treatment device 1 treating the unidirectional fiber bundle B overlapped with the resin films S. The unidirectional prepreg includes a flat band-like unidirectional fiber bundle B* (see FIG. 3) in which filaments constituting the opened unidirectional fiber bundle B are paralleled in one direction and arranged in a predetermined width and which is impregnated with the resin of the resin films S.

The treatment device 1 includes: the support 2; a head 3 including a resonator 31 for applying the ultrasonic vibrations to the unidirectional fiber bundle B in the pressing direction of arrow Z; pressure means 4 which drivably reciprocates the resonator 31 supported by support means 33 in the pressing direction of arrow Z; feeding means 5 for feeding the unidirectional fiber bundle B overlapped with the resin films S to space between a stage 2 and the head 3; and a control unit (not shown) for controlling the individual parts of the treatment device 1. The unidirectional fiber bundle B is formed by bundling the filaments constituting the reinforcement fiber such as carbon fiber, glass fiber and aramid fiber. The resin film S constituting a resin matrix is made from a thermosetting resin such as epoxy resin and unsaturated polyester resin; or a thermoplastic resin such as polyolefin resin; aliphatic polyamide resin; or polyethylene terephthalate resin. As shown in FIG. 3, the resin film S is formed in a tape shape having a width Ws slightly greater than a width Wb of the band-like fiber bundle B* formed by opening the unidirectional fiber bundle B.

The support 2 is disposed under the head 3 and includes the planar supporting surface 21 which holds the unidirectional fiber bundle B with the resin films S overlapped on the opposite sides thereof between itself and the pressing surface 35a of the horn 35 of the head 3. The support 2 is formed from any of a variety of suitable materials which include: a variety of metal materials such as titanium, titanium alloys, iron, stainless steel, aluminum, and aluminum alloys such as duralumin; glass; ceramics; and resins.

The support 2 may also be provided with a heater (not shown). Specifically, a main body of the support 2 is kept heated to a predetermined temperature by the heater. This makes it possible to decrease heat gradient produced between the resin film S and the support 2 when the heat is generated by the resin film S to which the ultrasonic vibrational energy is applied. Hence, heat transfer from the heat generating resin film S to the support 2 can be blocked. In this manner, the heater mounted to the support 2 is adapted to function as shielding means for preventing the heat transfer to the support 2. By keeping the main body of the support 2 heated to the predetermined temperature by the heater, the thermal energy of the heater can also be added to the ultrasonic vibrational energy applied to the resin film S from the pressing surface 35a of the horn 35. This approach ensures that the resin film S is reliably melted at the sufficiently raised temperature while preventing an excessive supply of the ultrasonic vibrational energy to the resin film S.

The head 3 includes: the resonator 31 one end of which is connected with a vibrator 32 (vibration means) for applying the ultrasonic vibrations to the resonator 31 in the pressing direction of arrow Z; and support means 33 for supporting the resonator 31. The vibrator 32 ultrasonically vibrates the resonator 31 (horn 35) whereby the ultrasonic vibrations are applied from the pressing surface 35a to the unidirectional fiber bundle B (resin film S).

Specifically, the resonator 31 resonates with the ultrasonic vibrations generated by the vibrator controlled by the control unit, so as to ultrasonically vibrate in an axial direction thereof (pressing direction) or in the direction of arrow Z. The resonator includes a booster 34 and the horn 35. A lower end of the booster 34 and an upper end of the horn 35 are interconnected with a headless screw in a manner that the center axes thereof are coaxially aligned.

According to this embodiment, the booster 34 is formed to have a length of one wavelength of resonant frequency such that opposite end positions thereof define the maximum amplitude points with respect to a substantially middle position thereof in the direction of arrow Z in FIG. 2. In this case, two points spaced by ¼ wavelength from the respective maximum amplitude positions in the direction of arrow Z correspond to first and second minimum amplitude points of the booster 34. The booster 34 is formed in a columnar configuration which has a circular cross section. The vibrator 32 is connected to an end of the booster 34 by means of a headless screw in a manner that the vibrator is coaxial with the center axis of the booster 34.

The booster 34 is formed with concave grooves in an outer peripheral surface thereof at positions corresponding to the first and second minimum amplitude points. The concave grooves are circumferentially extended, respectively defining gripped portions at which the booster 34 (resonator 31) is gripped by the support means 33. According to this embodiment, the gripped portion is formed in a configuration having an octagonal cross section substantially perpendicular to the center axis of the booster 34. However, the gripped portion may also be formed in a configuration, the cross section of which has a circular shape or any of other polygonal shapes.

The horn 35 (equivalent to "pressure body" of the invention) includes the planar pressing surface 35a which presses the unidirectional fiber bundle B (resin film S) in the pressing direction indicated by arrow Z perpendicular to the supporting surface of the support 2. The horn ultrasonically vibrates in resonance with the vibration of the vibrator 32 so as to apply the ultrasonic vibrations to the unidirectional fiber bundle B (resin film S) from the pressing surface 35a thereof. The horn 35 is formed to have a length of one half wavelength of the resonant frequency such that the opposite end positions thereof in the direction of arrow Z in FIG. 2 define the maximum amplitude points. In this case, a substantially middle position of the horn 35 in the direction of arrow Z as seen in FIG. 2 corresponds to a third minimum amplitude point. As shown in FIG. 2 and FIG. 3, the horn 35 is shaped like a rectangular parallelepiped. The pressing surface 35a of the horn 35 is configured to have a greater width in a widthwise direction of arrow X than the resin film S (opened band-like fiber bundle B*) (width Wh of horn 35≥width Ws of resin film S≥width Wb of band-like fiber bundle B*). The direction of arrow X is substantially perpendicular to the pressing direction of arrow Z and the longitudinal direction of arrow Y.

According to this embodiment, the resonator 31 is configured to have resonant frequencies on the order of 15 kHz to 60 kHz and vibrational amplitudes (amplitudes of stretching vibration in the direction of arrow Z) on the order of 2 μm to 300 μm. In conjunction with the resonator 31 ultrasonically vibrating in resonance with the ultrasonic vibrations produced by the vibrator 32, the pressing surface 35a of the horn 35 applies the ultrasonic vibrations to the unidirectional fiber bundle B (resin film S) in the pressing direction of arrow Z. The resonator 31 (booster 34, horn 35) is formed from any of a variety of metal materials commonly used for forming the resonator. The examples of the metal material include titanium, titanium alloys, iron, stainless steel, aluminum and aluminum alloys such as duralumin.

The resonator 31 (horn 35) may also be provided with a heater. Specifically, the resonator 31 (horn 35) is kept heated by the heater to a predetermined temperature. This makes it possible to decrease the heat gradient produced between the resin film S and the resonator 31 (horn 35) when the heat is generated by the resin film S to which the ultrasonic vibrational energy is applied. Hence, the heat transfer from the heat generating resin film S to the resonator 31 (horn 35) can be blocked. In this manner, the heater mounted to the resonator (horn 35) is adapted to function as shielding means for preventing the heat transfer to the resonator 31 (horn 35). By keeping the resonator 31 (horn 35) heated to the predetermined temperature by the heater, the thermal energy of the heater can also be added to the ultrasonic vibrational energy applied to the resin film S from the pressing surface 35a of the horn 35. This approach ensures that the resin film S is reliably melted at the sufficiently raised temperature while preventing an excessive supply of the ultrasonic vibrational energy to the resin film S.

The support means 33 includes a base 36 and clamp means 37, and serves to support the resonator 31 by gripping the gripped portions of the booster 34 by means of the clamp means 37. The base 36 is formed with a screw hole for threadable engagement with a ball screw 42 of the pressure means 4. The screw hole extends in the direction of arrow Z.

The clamp means 37 is mounted to the base 36 at two places so as to hold the two gripped portions formed on the booster 34. Each of the clamp means includes first and second members to hold the gripped portion of the booster 34. Specifically, the first and second members of the clamp means 37 are each formed with a concave having a configuration engageable with a cross-sectional shape of the gripped portion. In order to hold the gripped portion of the booster 34 between the concaves of the first and second members, the first and second members of the clamp means 37 supported by the base 36 are fittably inserted in the concave groove defining the gripped portion, and fixed in positions by means of a bolt. Thus, the gipped portion of the booster 34 is held by the clamp means 37.

The configuration of the support means 33 for supporting the resonator 31 is not limited to that of the clamp means 37 which is fixed by the bolt in the state where the clamp means holds the gripped portion formed on the booster 34, as described above. For example, the support means may have any configuration that is capable of supporting the gripped portion of the booster 34. Such a configuration is exemplified by a mechanical clamp mechanism which is electrically controllable, a clamp mechanism which can be mounted in one step, and the like.

The position of the gripped portion formed on the resonator 31 is not limited to the minimum amplitude point. The gripped portion may be formed at any position on the resonator 31. Further, the configuration of the gripped portion is not limited to the concave groove circumferentially formed in the outer peripheral surface of the resonator 31. For example, the gripped portion may be a convex flange circumferentially formed on the outer peripheral surface of the resonator 31. The gripped portion may be formed in any configuration that can be gripped by the support means 33. The gripped portion may also be supported by the support means 33 via an elastic member such as O-ring and diaphragm.

The pressure means 4 is adapted to drive the resonator 31 in the pressing direction of arrow Z so as to move the resonator close to or away from the support 2. The resonator 31 is supported by the support means 33 in a manner that the pressing surface 35a of the horn 35 is opposed to the supporting surface 21 of the support 2. The pressure means 4 includes a drive motor 41 and the ball screw 42. A guide 43 is coupled to a support post (not shown) upstanding from a stand (not shown). The pressure means 4 is coupled to the support post and the guide 43 via a frame 44.

The drive motor 41 rotates under the control of the control unit so that the support means 33 threadably engaged with the ball screw 42 is moved up and down in a movement direction of arrow Z while allowing a guide (not shown) thereof to make sliding contact with a convex rail 43a extended on the guide 43 in the direction of arrow Z. Thus, the resonator 31 supported by the support means 33 is moved close to or away from the support 2.

The pressure means 4 is configured to exert a predetermined pressure for moving the resonator 31 supported by the support means 33 close to the support 2 by adjusting the driving torque of the drive motor 41 based on control provided by the control unit. The support post is provided with a linear encoder (not shown), which detects a height of the head 3 in the (pressing) direction of arrow Z. The control unit control the drive motor 41 based on a detection signal from the linear encoder so that the height of the head 3 can be adjusted.

The center axis of the resonator 31 extends substantially in the same direction as that of the screw hole formed in the base 36. Namely, the direction of the center axis of the resonator 31 and the movement direction (pressing direction) of the resonator 31 moved by the pressure means 4 are substantially the same direction of arrow Z. The resonator 31 is supported by the support means 33 in a manner that the pressing surface 35a of the horn 35 is opposed to the support 2. The base 36 is moved down by the pressure means 4 whereby the resonator 31 (horn 35) is driven in the pressing direction of arrow Z to unitarily move close to the support 2. Thus, the pressure of the pressure means 4 is applied from the pressing surface 35a to the unidirectional fiber bundle B (resin film S) supported by the supporting surface 21 of the support 2. Under the control of the pressure means 4, the pressing surface 35a of the ultrasonically vibrating horn 35 applies pressure by pressing the unidirectional fiber bundle B (resin film S) against the supporting surface 21 of the support 2.

In this embodiment, the drive motor 41 is controlled by the control unit in order that the pressing surface 35a presses the unidirectional fiber bundle B (resin film S) against the supporting surface 21 with a predetermined constant pressure. The drive motor 41 is further controlled by the control unit in order that when a height position of the resonator 31 (base 36) in the pressing direction of arrow Z reaches a position H where the resonator 31 is stretched in maximum, as indicated by L in FIG. 2, so as to provide a predetermined gap G between the pressing surface 35a and the supporting surface 21, the resonator 31 is inhibited from moving beyond the position H toward the support 2. The degree of the pressure applied to the unidirectional fiber bundle B by the pressing surface 35a, and the magnitude of the gap G between the pressing surface 35a and the supporting surface 21 may be set ad libitum to optimum values according to the width and thickness of the opened band-like fiber bundle B* and the width and thickness of a unidirectional prepreg P. For example, the optimum values of the pressure and the gap G may be defined by repeating treatment tests on the unidirectional fiber bundle B and the resin film S. Further, the drive motor 41 may be controlled by the control unit in a manner that the resonator 31 applies a constant pressure before the height position of the resonator 31 in the pressing direction of arrow Z reaches the position H and that the resonator 31 is stopped when the height position H of the resonator 31 in the pressing direction of arrow Z reaches the position H.

As shown in FIG. 1, the feeding means 5 (equivalent to "movement means" of the invention) includes: a first feed roller 51 retaining a wound unidirectional fiber bundle B; second and third feed rollers 52, 53 each retaining a wound resin film S; a delivery roller 54; a tension adjusting roller 55; and a take-up roller 56. The unidirectional fiber bundle B and the resin films S are reeled out from the respective feed rollers 51 to 53 by being nipped by a drive roller 54a and a driven roller 54b (rotating in respective arrowed directions) of the delivery roller 54. The unidirectional fiber bundle B sandwiched between the resin films S is fed to space between the pressing surface 35a of the horn 35 and the supporting surface 21 of the support 2.

At this time, the unidirectional fiber bundle B with the resin films S overlapped on the opposite sides thereof is nipped by a drive roller 55a and a driven roller 55b (rotating in respective arrowed directions) of the tension adjusting roller 55 disposed on a downstream side from the head 3. Accordingly, the unidirectional fiber bundle B, as held between the pressing surface 35a and the supporting surface 21, is moved in the longitudinal direction of arrow Y, while being adjusted for the tension thereof. According to this embodiment, the unidirectional fiber bundle B (resin films S) is moved relative to the horn 35 in the longitudinal direction of arrow Y, so that the pressed part of the unidirectional fiber bundle B pressed by the pressing surface 35a with the predetermined constant pressure is moved in the longitudinal direction of arrow Y. Thus, the unidirectional prepreg P is formed as a result of passing the unidirectional fiber bundle B with the resin films S overlapped on the opposite sides thereof between the pressing surface 35a of the horn 35 and the supporting surface 21 of the support 2. The unidirectional prepreg P is wound around the take-up roller 56. Incidentally, either one of the second and third feed rollers 52, 53 may be provided such that the resin film S is overlapped on only one side of the unidirectional fiber bundle B.

By controlling the individual components of the treatment device 1 as described above, the control unit ultrasonically vibrates the resonator 31 (horn 35) by means of the vibrator 32 in the state where the resin film S (unidirectional fiber bundle B) is held between the supporting surface 21 of the support 2 and the pressing surface 35a of the horn 35. Thus, the control unit applies the ultrasonic vibrational energy to the resin film S via the pressing surface 35a so as to cause the resin film S to generate heat by which the resin film is melted.

Fiber Opening/Impregnation Treatment

Next, description is made on an example of a fiber opening/impregnation treatment performed by the treatment device 1.

First, a unidirectional fiber bundle B is prepared by bundling fibers constituting a predetermined reinforcement fiber into a band-like shape. A resin film S having a predetermined thickness is overlapped on either side of the unidirectional fiber bundle B. As shown in FIG. 3, the width of the unidirectional fiber bundle B is expanded to the width Wb while the unidirectional fiber bundle B is moved in the longitudinal direction of arrow Y as pressed against the supporting surface 21 of the support 2 with the predetermined pressure applied by the pressing surface 35a of the ultrasonically vibrating horn 35. The resultant band-like fiber bundle B*, the thickness of which is decreased to a predetermined thickness, is impregnated with the resin of the resin films S and thus is formed the unidirectional prepreg P.

According to the embodiment, as described above, the unidirectional fiber bundle B is held between the supporting surface 21 of the support 2 and the pressing surface 35a of the horn 35 ultrasonically vibrated in the pressing direction of arrow Z that is perpendicular to the supporting surface 21. In this state, the pressed part of the unidirectional fiber bundle B pressed by the pressing surface 35a is moved in the direction of arrow Y or the longitudinal direction of the unidirectional fiber bundle B so that the unidirectional fiber bundle B can be opened. In comparison with the prior-art technique utilizing the air flow, for example, a strong tension is exerted on the unidirectional fiber bundle B being opened. Hence, the unidirectional fiber bundle B can be opened by the stable, high-speed treatment.

In general, the opened band-like fiber bundle B* is instable and prone to tangle. However, in parallel with opening the unidirectional fiber bundle B, the band-like unidirectional fiber bundle B* can be impregnated with the melted resin of the resin film S by moving the unidirectional fiber bundle B (resin film S) in the longitudinal direction of arrow Y in the state where the unidirectional fiber bundle B overlapped with the resin film S is held between the supporting surface 21 and the pressing surface 35a. In contrast to the prior-art technique, there is no need for providing both of a fiber opening device and an impregnation device. The unidirectional prepreg P can be formed in one step. Therefore, the treatment cost of the unidirectional fiber bundle B can be reduced. With the application of the physical ultrasonic vibrations from the horn 35, the resin of the resin film S and the band-like fiber bundle B* are in contact with each other whereby a reaction at a bonding interface between the filaments constituting the reinforcement fiber and the resin is promoted. Hence, a good bonding state can be established, permitting the resin of the rein film S to be favorably impregnated into the band-like fiber bundle B*. This leads to the improvement of physical properties of molded articles using the unidirectional prepreg P. Since the band-like fiber bundle B* is impregnated with the resin in parallel with the fiber opening, the opened band-like fiber bundle B* is less prone to suffer fluff and the like. This leads to an easy handling of the opened fiber bundle B*.

The unidirectional fiber bundle B is opened while pressed with the predetermined pressure that is previously set according to the thickness of the unidirectional fiber bundle B as a treatment object or target values of the width Wb and thickness of the opened band-like fiber bundle B*. By doing so, the width Wb and the thickness of the opened fiber bundle B* can be adjusted with high accuracies.

Further, the unidirectional fiber bundle B is opened in a state where the pressing surface 35a is positioned such that a distance from the supporting surface 21 is not less than the predetermined gap G previously set according to the thickness of the unidirectional fiber bundle B as the treatment object, or the target values of the thickness and the width Wb of the opened band-like fiber bundle B*. By doing so, the thickness and the width Wb of the opened fiber bundle B* can be adjusted with high accuracies. In order to ensure that a distance between the supporting surface 21 and the pressing surface 35a of the ultrasonically vibrated horn 35 when stretched in maximum is always the predetermined gap G, the resonator 31 is fixed to the position H in the pressing direction of arrow Z (see FIG. 2). In this state, the unidirectional fiber bundle B (resin film S) may be moved in the longitudinal direction of arrow Y. By doing so, the thickness and the width Wb of the opened fiber bundle B* can be adjusted with high accuracies.

Second Embodiment

Figure 4:
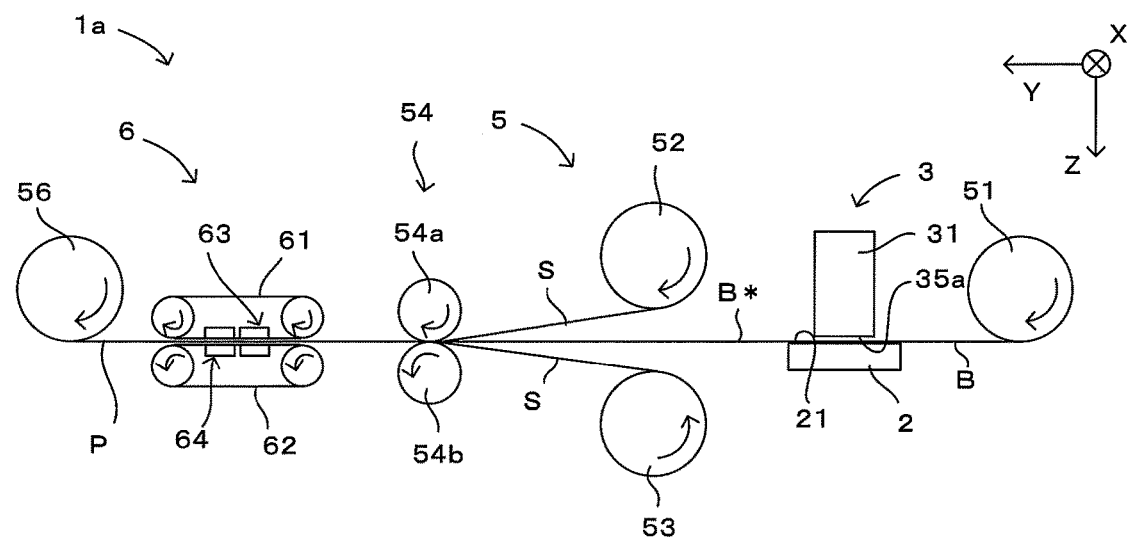
FIG. 4 is a front view showing a treatment device according to a second embodiment of the invention.

A treatment device according to a second embodiment of the invention is described with reference to FIG. 4. FIG. 4 is a front view showing the treatment device according to the second embodiment of the invention.

A treatment device 1a shown in FIG. 4 differs from the above-described first embodiment in that the impregnation treatment is performed by an impregnation device 6. Specifically, the unidirectional fiber bundle B without the resin film overlapped thereon is opened by passing the unidirectional fiber bundle B between the pressing surface 35a and the supporting surface 21. Subsequently, the band-like fiber bundle B* is overlapped with the resin films S and is subjected to the impregnation treatment by the impregnation device 6. The other components and operations are the same as those of the above-described first embodiment and hence, like reference characters refer to the corresponding components, the description of which is dispensed with.

As shown in FIG. 4, the impregnation device 6 is configured to vertically clamp and press the band-like fiber bundle B* with the resin films S overlapped on the opposite sides thereof. The impregnation device includes: belt units 61, 62 rotating in directions of arrows shown in the figure; and heating mechanisms 63 and cooling mechanisms 64 disposed inside the belt units 61, 62. The heating mechanism 63 is disposed on an upstream side, while the cooling mechanism 64 is disposed on a downstream side. The impregnation device 6 having such a configuration operates as follows. During the passage of the band-like fiber bundle B* with the resin films S overlapped on the opposite sides thereof, the band-like fiber bundle B* is impregnated with the resin of the resin films S on the upstream side. The resin is melted by being heated by the heating mechanism 63 as pressed by the belt units 61, 62. On the downstream side, the resin impregnated into the fiber bundle B* is solidified by being cooled by the cooling mechanism 64 as pressed by the belt units 61, 62. Thus is formed the unidirectional prepreg P. Similarly to the first embodiment, the tension adjusting roller 55 may also be provided ad libitum at an optimum place.

In this arrangement, as well, the unidirectional fiber bundle B can be opened by passing the fiber bundle between the pressing surface 35a and the supporting surface 21 just as in the above-described first embodiment. Thus, the unidirectional fiber bundle B can be opened by the stable, high-speed treatment. Further, the thickness (impregnation distance: the number of filaments constituting the reinforcement fiber) of the band-like fiber bundle B* impregnated with the resin can be reduced by stably opening the unidirectional fiber bundle B. Hence, the fiber bundle B* can be impregnated with the resin in a short time. Further, the production of void is suppressed so that impregnation failure can be prevented. This leads to the improvement of physical properties of the molded articles using the unidirectional prepreg P.

Third Embodiment

Figure 5:
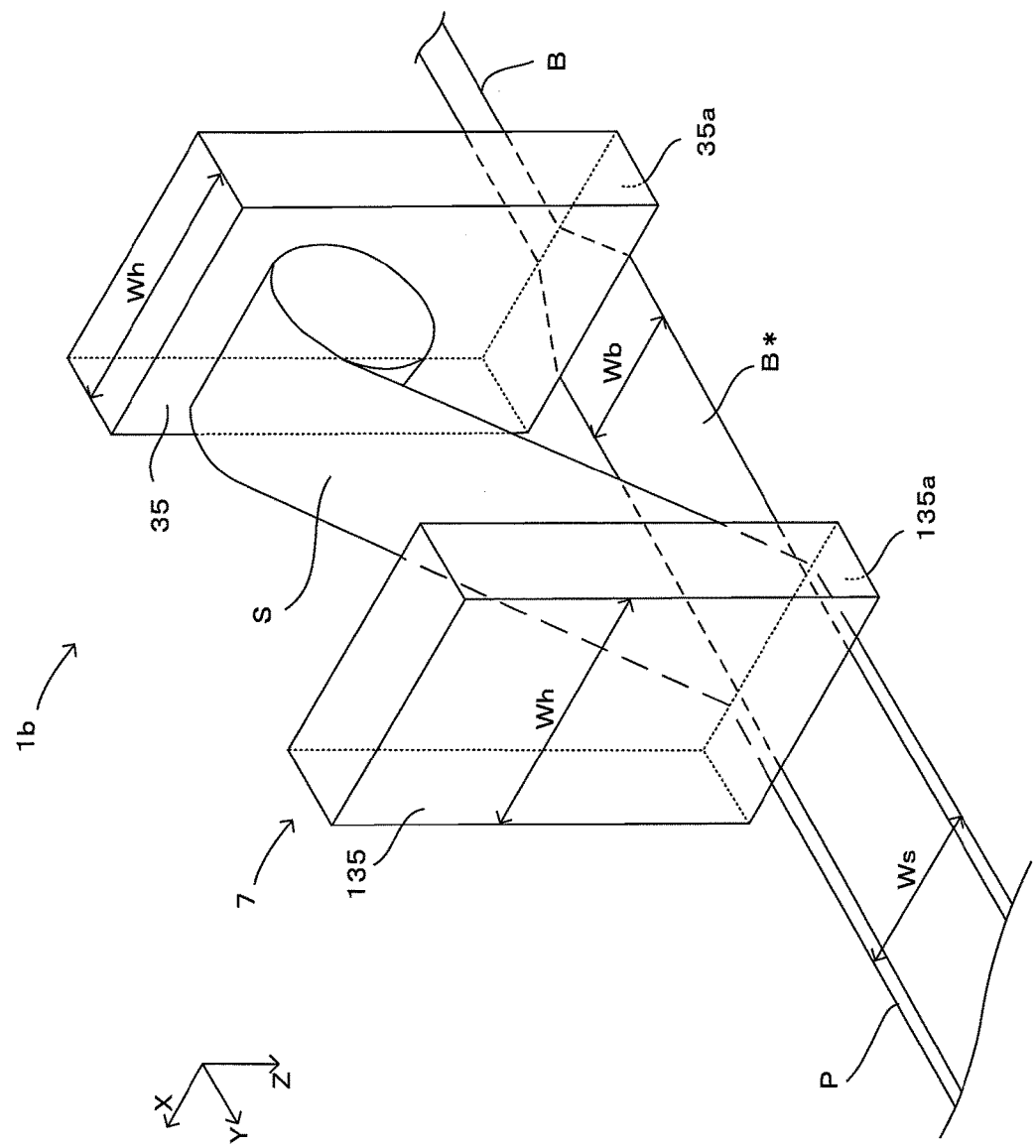
FIG. 5 is a perspective view showing an essential part of a treatment device according to a third embodiment of the invention.

A treatment device according to a third embodiment of the invention is described with reference to FIG. 5. FIG. 5 is a perspective view showing an essential part of the treatment device according to the third embodiment of the invention. Similarly to FIG. 3, FIG. 5 does not illustrate the resin film S and the support 2 which are disposed on the lower surface side of the band-like fiber bundle B*.

A treatment device 1b shown in FIG. 5 differs from the above-described second embodiment in that an impregnation device 7 has a different configuration. The other components and operations are the same as those of the above-described first embodiment and hence, like reference characters refer to the corresponding components, the description of which is dispensed with.

As shown in FIG. 5, the impregnation device 7 includes a horn 135 having substantially the same configuration as the horn 35 used for the fiber opening treatment. The band-like fiber bundle B* overlapped with the resin film S is passed between a pressing surface 135a of the horn 135 of the impregnation device 7 and the supporting surface 21 of the support 2 so that, similarly to the above-described first embodiment, the band-like fiber bundle B* is impregnated with the melted resin of the resin film S to which the ultrasonic vibrations are applied from the pressing surface 135a. Thus is formed the prepreg P.

In this arrangement, the molecular motion (vibration, rotation) of the resin molecules is accelerated by applying the ultrasonic vibrational energy so that the resin generates heat, by which the resin sheet S is quickly heated and melted. In comparison with the prior-art technique utilizing a pressure device such as the nip rollers and the arrangement of the above-described second embodiment, impregnation time can be further reduced by the effect of the application of ultrasonic vibrations. Furthermore, the impregnation device 7 (treatment device) can be improved in impregnation performance. Therefore, the unidirectional fiber bundle B (band-like fiber bundle B*) can be impregnated with the melted resin by the stable, high-speed treatment. In comparison with the prior-art technique utilizing the pressure device such as the nip rollers and the arrangement of the above-described second embodiment, the fiber bundle B (band-like fiber bundle B*) can be impregnated with the resin of the matrix resin such as the resin sheet S by means of the impregnation device 7 having the compact configuration. Since the impregnation treatment is performed by applying the ultrasonic vibrations just as in the above-described first embodiment, the reaction at the bonding interface between the filaments constituting the reinforcement fiber and the resin is promoted to establish the good bonding state. Hence, the resin of the resin film S can be favorably impregnated into the band-like fiber bundle B*. Accordingly, the molded articles using the unidirectional prepreg P can be improved in the physical properties.

The pressure means including an actuator such as the drive motor may be controlled by the control unit in a manner that the pressing surface 135a of the horn 135, similarly to that of the horn 35, presses the unidirectional fiber bundle B (resin film S) against the supporting surface 21 with the predetermined constant pressure. Further, the pressure means may be controlled by the control unit in a manner that when a height position of the horn 135 in the pressing direction of arrow Z reaches the position H where the horn 135 is stretched in maximum, as indicated by L in FIG. 2, so as to provide the predetermined gap G corresponding to a distance between the pressing surface 135a and the supporting surface 21, the horn 135, similarly to the horn 35, is inhibited from moving beyond the position H toward the support 2. The degree of the pressure applied to the unidirectional fiber bundle B (resin sheet S) by the pressing surface 135a, and the magnitude of the gap G between the pressing surface 135a and the supporting surface 21 may be set ad libitum to optimum values according to the width and thickness of the opened band-like fiber bundle B* and the width and thickness of the unidirectional prepreg P. Further, the pressure means may also be controlled by the control unit in a manner that the horn 135 applies a constant pressure before the height position of the horn 135 in the pressing direction of arrow Z reaches the position H and that the horn 135 is stopped when the height position of the horn 135 in the pressing direction of arrow Z reaches the position H.

The treatment device 1b need not include the fiber opening device (support 2, head 3). In this case, the feeding means 5 may be configured such that the unidirectional fiber bundle B (band-like fiber bundle B*) opened by a device other than the treatment device 1*b* is fed to the impregnation device 7 of the treatment device 1*b*.

Fourth Embodiment

A treatment device according to a fourth embodiment of the invention is described with reference to FIG. 6. FIG. 6 a transverse sectional view showing unidirectional fiber bundles and a resin sheet which are treated by the treatment device according to the fourth embodiment of the invention.

This embodiment differs from the above-described first to third embodiments in that the impregnation treatment is performed in a state where the resin film S is sandwiched between two unidirectional fiber bundles B or two opened band-like fiber bundles B*, as shown in FIG. 6. The other components and operations are the same as any of those of the above-described first to third embodiments and hence, like reference characters refer to the corresponding components, the description of which is dispensed with.

The same effects as those of the foregoing embodiments can be achieved by treating the unidirectional fiber bundles B (band-like fiber bundles B*) overlapped on the resin sheet S in this manner, as shown in FIG. 6.

Fifth Embodiment

Figure 7:
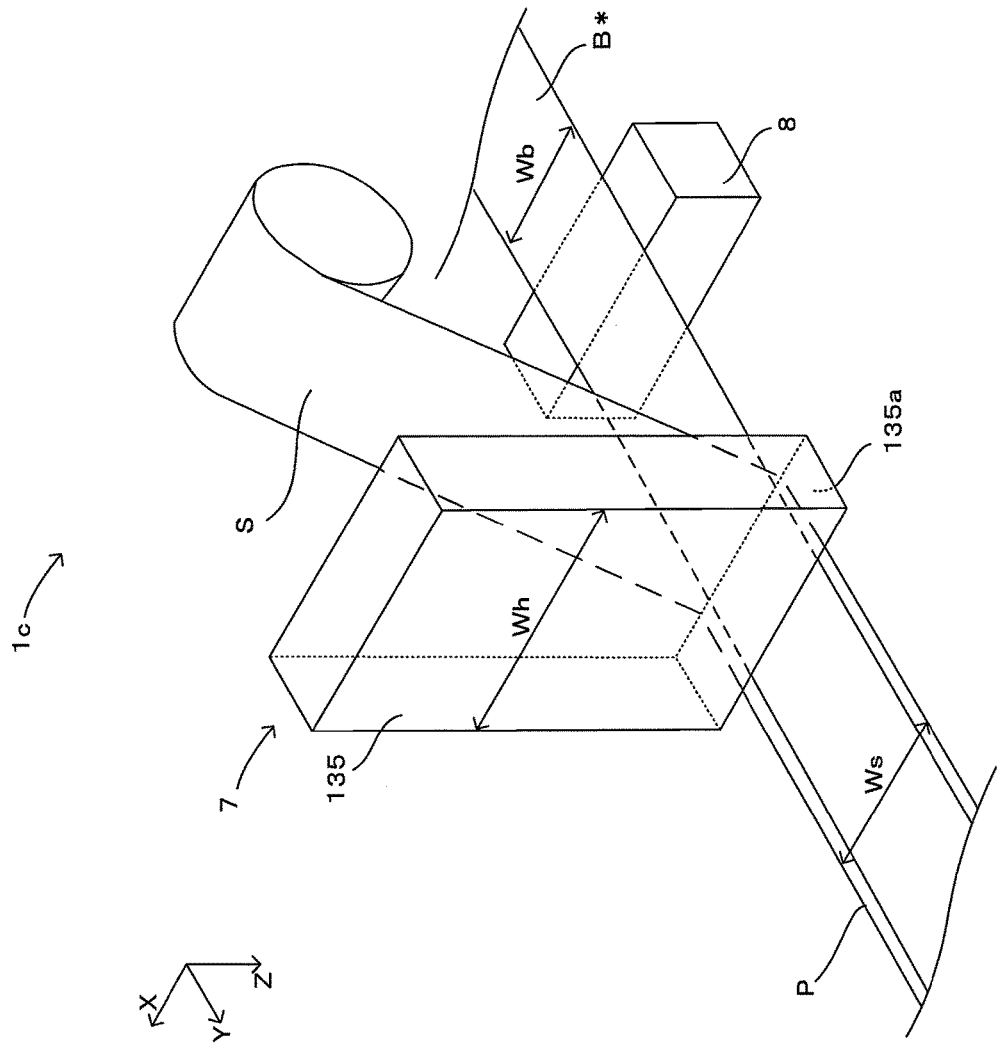
FIG. 7 is a perspective view showing an essential part of a treatment device according to a fifth embodiment of the invention.

A treatment device according to a fifth embodiment of the invention is described with reference to FIG. 7. FIG. 7 is a perspective view showing an essential part of the treatment device according to the fifth embodiment of the invention. Similarly to FIG. 5, FIG. 7 does not illustrate the resin film S and the support 2 which are disposed on the lower surface side of the band-like fiber bundle B*.

A treatment device 1*c* shown in FIG. 7 differs from the treatment device 1*b* shown in FIG. 5 in that the treatment device 1*c* further includes heating means 8 for heating the opened unidirectional fiber bundle B (band-like fiber bundle B*) before resin impregnation. The other components and operations are the same as those of the above-described first embodiment and hence, like reference characters refer to the corresponding components, the description of which is dispensed with.

The heating means 8 is for heating the unidirectional fiber bundle B (band-like fiber bundle B*) formed by bundling the filaments constituting the reinforcement fiber such as carbon fiber, glass fiber, and aramid fiber. The heating means consists of a commonly-used heating element such as heater, and induction heating device. In such an arrangement, adhesion between the unidirectional fiber bundle B (band-like fiber bundle B*) preheated by the heating means 8 and the melted resin can be increased. Hence, the band-like fiber bundle B* can be favorably impregnated with the resin.

Similarly to the above-described third embodiment, the treatment device 1*c* shown in FIG. 7 need not include the fiber opening device (support 2, head 3). In this case, the feeding means 5 may be configured such that the unidirectional fiber bundle B (band-like fiber bundle B*) opened by a device other than the treatment device 1*c* is fed to the impregnation device 7 and the heating device 8 of the treatment device 1*c*.

Sixth Embodiment

Figure 8:
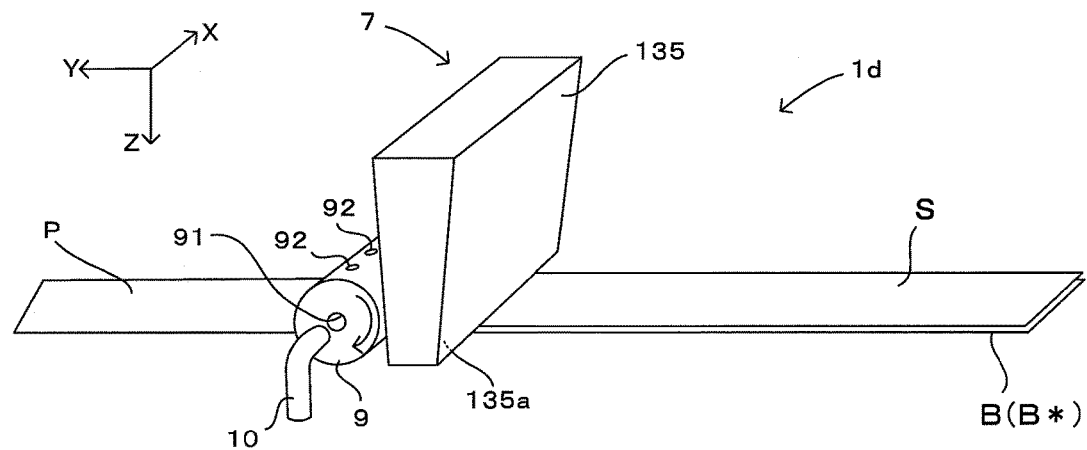
FIG. 8 is a perspective view showing an essential part of a treatment device according to a sixth embodiment of the invention.
Figure 9:
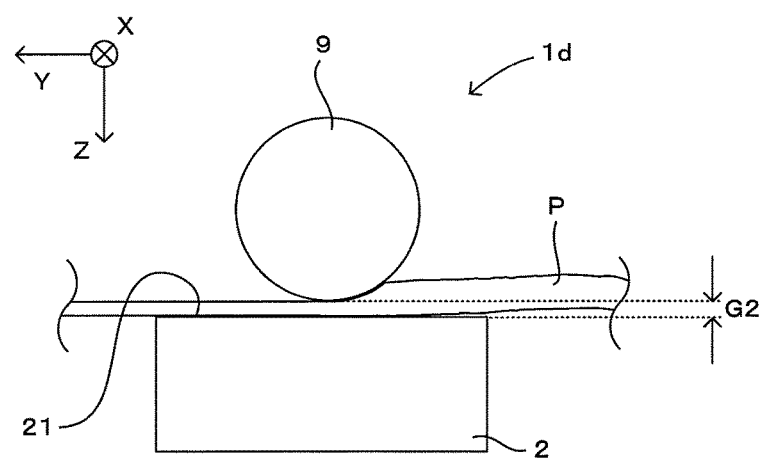
FIG. 9 is a front view showing an essential part of the treatment device of FIG. 8.

A treatment device according to a sixth embodiment of the invention is described with reference to FIG. 8 and FIG. 9. FIG. 8 is a perspective view showing an essential part of the treatment device according to the sixth embodiment of the invention. FIG. 9 is a front view showing an essential part of the treatment device of FIG. 8. Similarly to FIG. 5 and FIG. 7, FIG. 9 does not illustrate the resin film S and the support 2 which are disposed on the lower surface side of the band-like fiber bundle B*.

A treatment device 1*d* shown in FIG. 8 differs from the treatment device 1*b* of FIG. 5 and the treatment device 1*c* of FIG. 7 in that the treatment device 1*d* includes: a pressing member 9 for pressing the unidirectional fiber bundle B (unidirectional prepreg P) after resin impregnation against the supporting surface 21 of the support 2; and cooling means 10 for cooling the pressing member 9. The other components and operations are the same as those of the above-described first embodiment and hence, like reference characters refer to the corresponding components, the description of which is dispensed with.

The pressing member 9 is formed in a roller shape, the center axis of which is disposed substantially perpendicular to the longitudinal direction of the unidirectional fiber bundle B (band-like fiber bundle B*) or the direction of arrow Y (moving direction of the unidirectional fiber bundle B). While rotating about the center axis thereof, the pressing member 9 presses the unidirectional prepreg P against the supporting surface 21 by way of the peripheral surface thereof. It is noted here that the pressing member 9 is configured to be driven by an unillustrated actuator such as motor or cylinder or to be urged by unillustrated urging means such as spring so as to press the unidirectional prepreg P against the supporting surface 21 with the predetermined pressing force. As shown in FIG. 9, a peripheral surface of the pressing member 9 is spaced a predetermined distance G2 from the supporting surface 21.

The cooling means 10 cools down the pressing member 9 by blowing air into the pressing member. As shown in FIG. 8, the pressing member 9 includes an inlet port 91, and an outlet port 92 communicated with this inlet port via a flow passage (not shown) in the member 9. The cooling means 10 cools the pressing member 9 by feeding air into the pressing member 9 from the inlet port 91 and blowing the air through the flow passage in the pressing member 9 and out of the outlet port 92.

As shown in FIG. 9, the width of the unidirectional prepreg P can be adjusted with high accuracies by means of the pressing member 9 which presses the unidirectional prepreg P against the supporting surface 21 with a predetermined pressing force previously set according to a target value of the width or the like of the unidirectional prepreg P. Further, as shown in FIG. 9, the thickness of the unidirectional prepreg P can be adjusted with high accuracies by means of the pressing member 9 which presses the unidirectional prepreg P against the supporting surface 21 in a state where the pressing member 9 is spaced from the supporting surface 21 by the predetermined distance G2 previously set according to a target value of the thickness of the unidirectional prepreg P. In this manner, the pressing member 9 presses the unidirectional fiber bundle B (band-like fiber bundle G*) after impregnation treatment against the supporting surface 21 so that the unidirectional prepreg P is prevented from coming off the supporting surface 21 or expanding due to residual heat. Thus, the configuration of the unidirectional prepreg P can be properly shaped by the pressing member 9.

The resin impregnated into the unidirectional fiber bundle B (band-like fiber bundle B*) can be quickly cooled and hardened by the pressing member 9 cooled by the cooling means 10. An arrangement may be made such that the air blown out of the outlet port 92 is applied to the resin impregnated into the unidirectional fiber bundle B (band-like fiber bundle B*). Such an arrangement can increase an effect of cooling the impregnated resin.

Further, the rotational phase of the pressing member 9 is shifted from the moving speed of the unidirectional prepreg P so as to cause the peripheral surface of the pressing member 9 to slide on the surface of the unidirectional prepreg P. Thus, the surface of the unidirectional prepreg P can be smoothened.

Figure 10:
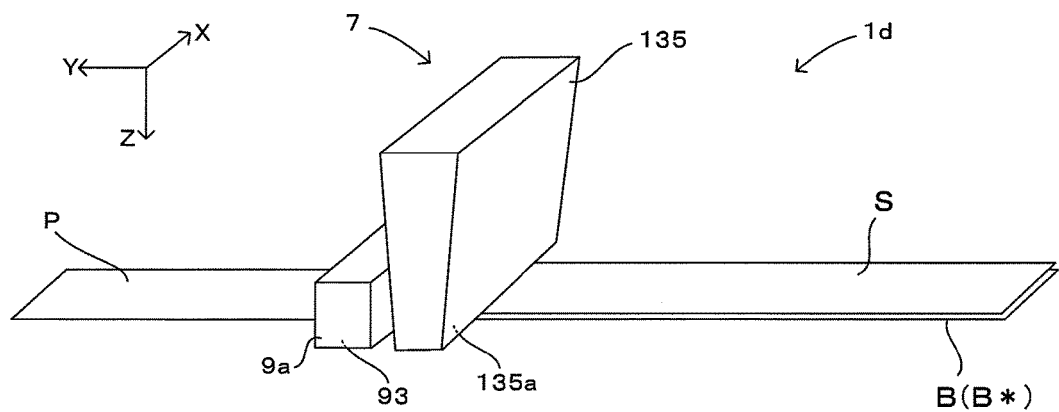
FIG. 10 is a diagram showing a modification example of the treatment device of FIG. 9.

Next, a modification example of the pressing member is described with reference to FIG. 10. FIG. 10 is a diagram showing a modification example of the treatment device of FIG. 9.

A pressing member 9a of the treatment device 1d shown in FIG. 10 differs from the roller-shaped pressing member 9 of the treatment device 1d of FIG. 8 in that the pressing member 9a has a pressing surface 93 and presses the unidirectional prepreg P against the supporting surface 21 of the support as maintaining the pressing surface 93 in sliding contact with the unidirectional prepreg P. FIG. 10 illustrates the pressing member 9a shaped like a square column having the pressing surface 93. However, the configuration of the pressing member 9a is not limited to the square column but may be in any configuration that includes the pressing surface 93. Although not shown in the figure, the pressing member 9a is also provided with the inlet port 91, and the outlet port 92 communicated with this inlet port via the flow passage (not shown) in the member 9a. The cooling means 10 cools the pressing member 9 by feeding air into the pressing member 9a from the inlet port 91 and blowing the air through the flow passage in the pressing member 9a and out from the outlet port 92.

In a case where the unidirectional fiber bundle B and the resin sheet S are fixed at place while the horn 135 is moved in the longitudinal direction of the unidirectional fiber bundle B indicated by arrow Y, the horn 135 and the pressing member 9, 9a may be configured to move in unison. While the cooling means 10 according to this embodiment is adapted to cool the pressing member 9, 9a based on an air cooling method, the cooling means 10 may also be adapted to cool the pressing member 9, 9a based on a water cooling method.

The pressing member 9, 9a may as well press the unidirectional fiber bundle B against the supporting surface 21 with such a predetermined pressure as to be suitable for maintaining the shaped configuration of the unidirectional fiber bundle B after impregnation treatment. Otherwise, the pressing member 9, 9a may as well press the unidirectional fiber bundle B against the supporting surface 21 in the state where the pressing member 9, 9a is spaced from the supporting surface 21 by such a predetermined distance G2 as to be suitable for maintaining the shaped configuration of the unidirectional fiber bundle B after impregnation treatment. Such arrangements ensure that the pressing member 9, 9a can more reliably maintain the shaped configuration of the unidirectional fiber bundle B impregnated with the resin.

Seventh Embodiment

Figure 11:
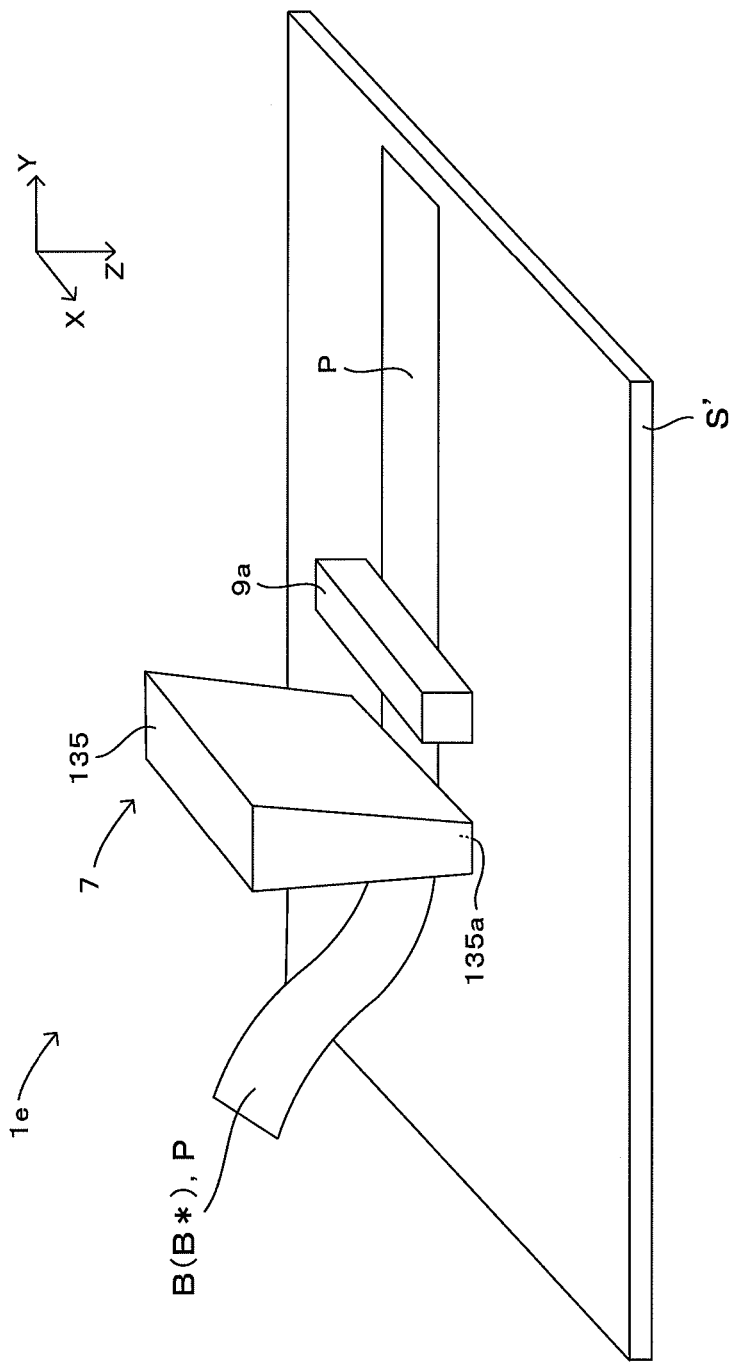
FIG. 11 is a perspective view showing an essential part of a treatment device according to a seventh embodiment of the invention.

A treatment device according to a seventh embodiment of the invention is described with reference to FIG. 11. FIG. 11 is a perspective view showing an essential part of the treatment device according to the seventh embodiment of the invention. It is noted that FIG. 11 does not illustrate the support 2.

A treatment device 1e shown in FIG. 11 differs from the above-described treatment device 1d of FIG. 8 and FIG. 10 in that a resin palate S' (resin member) forming the matrix resin, and the unidirectional fiber bundle B (band-like fiber bundle B*) or the unidirectional prepreg P are disposed in overlapping relation so that the unidirectional fiber bundle B (band-like fiber bundle B*) or the unidirectional prepreg P is impregnated with the melted resin of the resin palate S'. In a case where a unidirectional prepreg P (UD tape) is placed on the resin palate S', the resin impregnated fiber bundle B is further impregnated with the resin of the resin palate S'. The treatment device may include the pressing member in place of the pressing member 9a. The other components and operations are the same as those of the above-described first embodiment and hence, like reference characters refer to the corresponding components, the description of which is dispensed with.

Such an arrangement can achieve the same effects as those of the above-described sixth embodiment. The resin plate S' has a large heat capacity and hence, the melted resin impregnated into the unidirectional fiber bundle B is slow to cool down. However, the resin impregnated into the unidirectional fiber bundle B can be quickly cooled and hardened by means of the pressing member 9, 9a which presses the resin-impregnated unidirectional fiber bundle B against the supporting surface 21 in parallel with cooling the melted resin.

The following arrangement may be made in a case where the horn 135 and the pressing member 9, 9a are unitarily moved in the longitudinal direction of the unidirectional fiber bundle B (band-like fiber bundle B*). The feed roller having the unidirectional fiber bundle B (band-like fiber bundle B*) or the unidirectional prepreg P (UD tape) wound therearound for feeding the fiber bundle or the prepreg to below the pressing surface 135a of the horn 135 is disposed on the upstream side of the horn 135 in the moving direction (longitudinal direction) of the horn 135 (pressing member 9, 9a) indicated by arrow Y. Further, the horn 135 (pressing member 9, 9a) and the feed roller are configured to move in unison. In this arrangement, while the horn 135 (pressing member 9, 9a) and the feed roller are unitarily moved with the resin plate S' fixed at place, the feed roller can feed the unidirectional fiber bundle B (band-like fiber bundle B*) or the unidirectional prepreg P (UD tape) to below the pressing surface 135a. Then, the impregnation device 7 can continuously melt the resin of the resin plate S and impregnate the melted resin into the unidirectional fiber bundle B (band-like fiber bundle B*) or the unidirectional prepreg P (UD tape) thus fed.

Eighth Embodiment

A treatment device according to an eighth embodiment of the invention is described with reference to FIG. 12. FIG. 12 is a front view showing the treatment device according to the eighth embodiment of the invention.

A treatment device 1f shown in FIG. 12 differs from the treatment device 1 of FIG. 1 in that the device 1f includes: pressure-body side shielding means 11a for blocking heat transfer from the resin film S to the resonator 31 (horn 35); and support side shielding means 11b for blocking heat transfer from the resin film S to the support 2. The other components and operations are the same as those of the above-described first embodiment and hence, like reference characters refer to the corresponding components, the description of which is dispensed with.

The pressure-body side shielding means 11a includes: a feed roller 111a retaining a band-like heat insulation film Ia wound therearound; and a take-up roller 112a. The heat insulation film is formed from a material having low thermal conductivity, which includes: resin materials including: a variety of fluorine resins such as polytetrafluoroethylene (PTFE), perfluoroalkoxy fluorine resin (PFA), tetrafluoroethylene-hexafluoropropylene copolymer (FEP), and ethylene-tetrafluoroethylene copolymer (ETFE); glass-fiber filled fluorine resins; and Pyrogel (trademark) having low thermal conductivity and commercially available from NICHIAS Corporation. By the feed roller 111a and the take-up roller 112a rotating in respective arrowed directions, the heat insulation film Ia is reeled out from the feed roller 111a and fed to space between the pressing surface 35a of the horn 35 and the resin film S (unidirectional fiber bundle B). Thus, heat transfer from the resin film S to the resonator 31 (horn 35) is blocked. At this time, the heat insulation film Ia is reeled out from the feed roller 111a and reeled in by the take-up roller 112a in a manner that the heat insulation film Ia is moved in the longitudinal direction of arrow Y at substantially the same velocity as the unidirectional fiber bundle B with the resin films S overlapped on the opposite sides thereof.

By forming the heat insulation film Ia from a fluorine resin or the like having good releasability, the heat insulation film is also adapted to serve as a release film for preventing the adhesion of the melted resin film S to the pressing surface 35a of the horn 35. The unidirectional fiber bundle B (unidirectional prepreg P) with the resin films S overlapped on the opposite sides thereof can be favorably moved in the direction of arrow Y. Instead of being moved in the direction of arrow Y as described above, the heat insulation film Ia may be fixedly disposed at place between the pressing surface 35a of the horn 35 and the resin film S (unidirectional fiber bundle B).

Although not shown in the figure, the pressure-body side shielding means 11a may also be provided for the horn 135 of the impregnation device 7 of FIG. 5, FIG. 7, FIG. 8, FIG. 10 or FIG. 11. In this arrangement, the thermal energy derived from the application of the ultrasonic vibrational energy is prevented from transferring and leaking from the resin sheet S or the resin plate S' to the horn 135.

The support side shielding means 11b includes: a feed roller 111b retaining a band-like heat insulation film Ib wound therearound; and a take-up roller 112b. The heat insulation film is formed from a material having low thermal conductivity, which includes: resin materials including: a variety of fluorine resins such as polytetrafluoroethylene (PTFE), perfluoroalkoxy fluorine resin (PFA), tetra fluoroethylene-hexafluoropropylene copolymer (FEP), and ethylene-tetrafluoroethylene copolymer (ETFE); glass-fiber filled fluorine resins; and Pyrogel (trademark) having low thermal conductivity and commercially available from NICHIAS Corporation. By the feed roller 111b and the take-up roller 112b rotating in respective arrowed directions, the heat insulation film Ib is reeled out from the feed roller 111b and fed to space between the supporting surface 21 of the support 2 and the resin film S (unidirectional fiber bundle B). Thus, heat transfer from the resin film S to the support 2 is blocked. At this time, the heat insulation film Ib is reeled out from the feed roller 111b and reeled in by the take-up roller 112b in a manner that the heat insulation film Ib is moved in the longitudinal direction of arrow Y at substantially the same velocity as the unidirectional fiber bundle B with the resin films S overlapped on the opposite sides thereof.

By forming the heat insulation film Ib from a fluorine resin or the like having good releasability, the heat insulation film is also adapted to serve as a release film for preventing the adhesion of the melted resin film S to the supporting surface 21 of the support 2. The unidirectional fiber bundle B (unidirectional prepreg P) with the resin films S overlapped on the opposite sides thereof can be favorably moved in the direction of arrow Y. Instead of being moved in the direction of arrow Y as described above, the heat insulation film Ib may be fixedly disposed at place between the supporting surface 21 of the support 2 and the resin film S (unidirectional fiber bundle B).

It has been thought that the application of the ultrasonic vibrations from the pressing surface 35a of the horn 35 produces frictional heat because of abrasion between the treatment objects such as the overlapped resin film S and the like or resin plate S' and the like, so that the resin is melted. The present inventors have performed thermographic observation of the treatment objects made from resin to which the ultrasonic vibrations were applied from the pressing surface 35a of the horn 35a, and closely examined temperature distribution of the treatment objects. As a result, the inventors have found that edges of the treatment object which did not make contact with the pressing surface 35a are also raised in temperature. This is probably because, just as the principle of a microwave oven, the resin molecules are activated to vibrate and rotate by the ultrasonic vibrational energy applied from the pressing surface 35a of the horn 35 to the treatment object such as the resin film S or the resin plate S', so that the whole body of the treatment object is raised in temperature.

The present inventors have also found that when the pressing surface 35a of the horn 35 leaves the treatment object after the ultrasonic treatment, the horn 35 remains heated. This is probably because the thermal energy produced in the treatment object by the application of the ultrasonic vibrational energy is transferred to the horn 35, leaking out of the treatment object, so as to heat the horn 35. Based on the examination results, the present inventors have obtained the following findings. In order that the ultrasonic vibrational energy is efficiently used for treating the treatment object during the treatment by the application of the ultrasonic vibrational energy from the pressing surface 35a of the horn 35, it is crucial to prevent the thermal energy, produced in the entire treatment object by the application of the ultrasonic vibrational energy, from leaking to the horn 35 and the support 2 so as to confine the thermal energy within the treatment object.

In this embodiment, therefore, the heat transfer from the resin film S to the horn 35 and the support 2 is blocked when the heat is produced in the resin film S by the application of ultrasonic vibrational energy for accelerating the molecular motion (vibration, rotation) of the resin molecules. Hence, the heat produced in the resin film S is prevented from conductively leaking to the support 2 and the horn 35, so that the heat can be confined in the resin film S. Thus, the thermal energy induced in the resin film S by the application of ultrasonic vibrational energy can be confined in the resin film S. Instead of applying an excessive degree of ultrasonic vibrational energy, such a suitable degree of ultrasonic vibrational energy as not to damage the resin film S may be used for reliably heating the resin film S to the predetermined temperature for resin melting.

When, with the resin film S (unidirectional fiber bundle B) held between the supporting surface 21 of the support 2 and the pressing surface 35a of the ultrasonically vibrating horn 35, the pressed part of the resin film S pressed by the pressing surface 35a is continuously moved at a predetermined speed in the longitudinal direction of the resin film S as indicated by arrow Y, an application (injection) position of the ultrasonic vibrational energy is shifted on the resin film S from moment to moment. In the prior-art arrangement, the ultrasonic vibrational energy is not efficiently utilized for raising the temperature at the part of the resin film S that is contacted by the pressing surface 35a, because the thermal energy induced by the application of ultrasonic vibrational energy conductively leaks to the support 2 or the horn 35. As suggested by this embodiment, on the other hand, the thermal energy is confined in the resin film S by blocking the heat transfer from the resin film S to the horn 35 and the support 2 whereby the ultrasonic vibrational energy can be efficiently utilized for raising the temperature at the part of the resin film S that is contacted by the pressing surface 35a. Hence, the treatment object made from resin such as the resin film S and the resin plate S' having a larger area than the pressing surface 35a can be treated by using the horn 35 having the pressing surface 35a smaller than a range to be heated and by continuously moving the pressed part of the resin film pressed by the pressing surface 35a.

The invention is not limited to the foregoing embodiments and a variety of changes or modifications other than the above can be made thereto without departing from the spirit or essential characteristics thereof. The components of the above-described embodiments may be combined in any ways. For example, the pressed part of the unidirectional fiber bundle B pressed by the pressing surface 35a, 135a of the horn 35, 135 may be moved by moving the horn 35, 135 (resonator 31) in the longitudinal direction of arrow Y. Otherwise, the pressed part of the unidirectional fiber bundle B pressed by the pressing surface 35a, 135a of the horn 35, 135 may be moved by relatively moving both of the horn 35, 135 (resonator 31) and the unidirectional fiber bundle B in the longitudinal direction of arrow Y.

A cylinder may be added to the above-described pressure means 4 such that the differential pressure of the cylinder is used for setting the pressure applied to the unidirectional fiber bundle B by the pressing surface 35a of the horn 35.

In the second and third embodiments, the configurations of the impregnation devices are not limited to the above examples. The impregnation treatment may be performed by using a commonly used impregnation device.

The configurations such as the shapes of the pressure body and the pressing surface are not limited to those of the above-described horns 35, 135. The pressure body may be configured in any structure so long as the pressure body has the planar pressing surface, with which the pressure body can press the unidirectional fiber bundle B against the supporting surface 21 at least across the width of the fiber bundle. For example, the horn 35, 135 can be formed in a beaked shape tapered toward the pressing surface 35a, 135a as seen in side view. Alternatively, if the pressing surface is configured to uniaxially press the treatment object such as the unidirectional fiber bundle B (band-like fiber bundle B*), the resin film S, or the resin plate S' against the supporting surface 21 across the width of the object, the pressed part of the treatment object pressed by the pressing surface can be treated on the whole surface thereof by only one scanning (traversing) of the pressed part in a predetermined direction (e.g., direction of the pressing surface substantially perpendicular to the longitudinal direction).

The above-described pressure means 4 is not limited to the above-described configuration. The pressure means 4 may be configured in any structure so long as the pressure means can move the resonator 31. For example, the pressure means may employ a well-known actuator such as linear motor or cylinder.

The respective positions of the pressure body and the support are not limited to the above-described example where these components are vertically arranged as seen on the drawing surface of FIG. 1. The upper and lower positions of the pressure body and the support may be reversed. Alternatively, the pressure body and the support may be arranged in a horizontal direction as seen on the drawing surface of FIG. 1.

A heat insulation layer made from any of fluorine resins such as polytetrafluoroethylene (PTFE) or a material having low thermal conductivity, such as zirconia, may be formed on the surface of the horn 35, 135. In such an arrangement, as well, the heat transfer from the resin film S or the resin plate S' to the horn 35, 135 can be blocked by the heat insulation layer so that the thermal energy induced by the application of ultrasonic vibrational energy can be confined in the resin film S or the resin plate S'. Therefore, the resin film S or the resin plate S' can be treated by efficiently using the ultrasonic vibrational energy. Thus, the heat insulation layer provided at the resonator 31 (horn 35, 135) is adapted to function as the shielding means for blocking the heat transfer to the resonator 31 (horn 35, 135).

Further, the heat insulation layer made from any of fluorine resins such as polytetrafluoroethylene (PTFE) or a material having low thermal conductivity, such as zirconia, (fine) ceramics or glass, may also be overlaid on the surface of the support 2 (supporting surface 21). In such an arrangement, as well, the heat transfer from the resin film S or the resin plate S' to the support 2 can be blocked by the heat insulation layer so that the thermal energy induced by the application of ultrasonic vibrational energy can be confined in the resin film S or the resin plate S'. Therefore, the resin film S or the resin plate S' can be treated by efficiently using the ultrasonic vibrational energy. Thus, the heat insulation layer provided at the support 2 is adapted to function as the shielding means for blocking the heat transfer to the support 2.

It is preferred to set the thermal conductivity of the resonator 31 (horn 35, 135) and the support 2 to less than 10 W/(m·K). For example, it is preferred to form each of the resonator 31 (horn 35, 135) and the support 2 from a titanium alloy having a low thermal conductivity (e.g., Ti-6Al-4V having a thermal conductivity of 7.5 W/(m·K)). Alternatively, the support 2 may also be formed from a material such as crystal (8 W/(m·K)), glass (1 W/(m·K)) or fine ceramics (mullite, forsterite, cordierite, zirconia, steatite, etc.). In such an arrangement, as well, the thermal energy induced by the application of ultrasonic vibrational energy can be prevented from conductively leaking from the resin film S or resin plate S' to the horn 35, 135 and the support 2 because the thermal conductivities of the resonator 31 (horn 35, 135) and the support 2 are set to low levels. Thus, the thermal energy induced by the application of ultrasonic vibrational energy can be confined in the resin film S or the resin plate S' so that the resin film S or the resin plate S' can be treated by efficiently using the ultrasonic vibrational energy. Thus, the resonator 31 (horn 35, 135) and the support 2 are each adapted to function as the shielding means for shielding heat.

The horn 135 of the impregnation device 7 (treatment device) shown in FIG. 5, FIG. 7, FIG. 8, FIG. 10 and FIG. 11 may be provided with a heater. In such an arrangement, when the resin film S or the resin plate S' produces heat in conjunction with the application of ultrasonic vibrational energy, the heat gradient produced between the resin film S or the resin plate S' and the horn 135 can be reduced by virtue of the heater keeping the horn 135 heated to the predetermined temperature. Therefore, the heat transfer from the heated resin film S or resin plate S' to the horn 135 can be blocked. Thus, the heater provided at the horn 135 is adapted to function as the shielding means for blocking the heat transfer to the horn 135. By previously heating the horn 135 to the predetermined temperature by means of the heater, the thermal energy of the heater can also be added to the ultrasonic vibrational energy applied to the resin film S or the resin plate S' from the pressing surface 135a of the horn 135. This arrangement ensures that the resin film S or the resin plate S' can be reliably melted by sufficiently raising the temperature thereof while preventing an excessive supply of the ultrasonic vibrational energy to the resin film S or the resin plate S'.

A release sheet made from a resin having excellent releasability, such as a fluorine resin, or a release sheet made from a metal such as titanium, titanium alloy, copper, or stainless steel may be interposed between the supporting surface 21 of the support 2 and the unidirectional fiber bundle B (resin sheet S, resin plate S') or between the pressing surface 35a, 135a of the horn 35, 135 and the unidirectional fiber bundle B (resin sheet S, resin plate S'). The ultrasonic vibration can be more reliably transmitted to the unidirectional fiber bundle B (resin sheet S, resin plate S') by employing the release sheet made from the metal.

While the above-described embodiments have been described with reference to the unidirectional fiber bundle B (including the band-like fiber bundle B*) bundling filaments constituting the reinforcement fiber or the unidirectional prepreg P (UD tape), as the examples of the reinforcement fiber impregnated with the resin, the reinforcement fiber impregnated with the resin is not limited to the above-described unidirectional fiber bundle B and unidirectional prepreg P (UD tape). For example, sheet, fabric, textile, unwoven fabric or knit (each also including those impregnated with the resin) made by flatly weaving the filaments constituting the reinforcement fiber; sheet, fabric, textile, unwoven fabric or knit (each also including those impregnated with the resin) made by flatly weaving the unidirectional fiber bundles B (including the band-like fiber bundles B*) each bundling the filaments constituting the reinforcement fiber; sheet made by flatly weaving the unidirectional prepregs P; or a molded article made by forming the unidirectional prepreg into a braid configuration may also be impregnated with the resin of the resin member (matrix resin) such as the resin sheet S and resin plate S'.

Further, the resin impregnated into the reinforcement fiber may also be used as the matrix resin (resin member) to be impregnated into another reinforcement fiber. In this case where the resin impregnated into the reinforcement fiber is used as a matrix resin (resin member) to be impregnated into another reinforcement fiber, the other reinforcement fiber in question may be already impregnated with the other matrix resin.

INDUSTRIAL APPLICABILITY

The present invention can be widely applied to the treatment devices and treatment methods for treating the reinforcement fiber.

LIST OF REFERENCE SIGNS 1,1a,1b,1c,1d,1e,1f . . . treatment device
2 . . . support
21 . . . supporting surface
32 . . . vibrator (vibration means)
35 . . . horn (pressure body)
35a . . . pressing surface
5 . . . feeding means (movement means)
8 . . . heating means
9,9a . . . pressing member
10 . . . cooling means
B . . . unidirectional fiber bundle (reinforcement fiber)
G . . . gap
G2 . . . distance
S . . . resin film (resin member)
S' . . . resin plate (resin member)
Y . . . arrow (longitudinal direction)
Z . . . arrow (pressing direction)

The invention claimed is:

1. A treatment device for treating reinforcement fiber comprising:
   a support including a supporting surface;
   a pressure body including a pressing surface;
   vibration means for applying ultrasonic vibrations to the pressure body in a pressing direction perpendicular to the supporting surface; and
   movement means for moving a unidirectional fiber bundle relative to the pressure body in a state where the unidirectional fiber bundle as the reinforcement fiber is held between the supporting surface and the pressing surface of the pressure body ultrasonically vibrated by the vibration means in the pressing direction, wherein
   the unidirectional fiber bundle is opened while the movement means is moving a pressed part of the unidirectional fiber bundle pressed by the pressing surface in a longitudinal direction of the unidirectional fiber bundle.

2. A treatment device for treating reinforcement fiber comprising:
   a support including a supporting surface;
   a pressure body including a pressing surface;
   vibration means for applying ultrasonic vibrations to the pressure body in a pressing direction perpendicular to the supporting surface; and
   movement means for moving the reinforcement fiber and a resin member relative to the pressure body in a state where the reinforcement fiber overlapped with the resin member is held between the supporting surface and the pressing surface of the pressure body ultrasonically vibrated by the vibration means in the pressing direction, wherein
   the reinforcement fiber is impregnated with a resin of the resin member while the movement means is moving a pressed part of the reinforcement fiber pressed by the pressing surface.

3. The treatment device according to claim 2, wherein the reinforcement fiber is a unidirectional fiber bundle, and in a state where the unidirectional fiber bundle opened into a band-like shape is overlapped with the resin member and held between the supporting surface and the pressing surface, the movement means moves a pressed part of the unidirectional fiber bundle pressed by the pressing surface in a longitudinal direction of the unidirectional fiber bundle.

4. The treatment device according to claim 2, further comprising a pressing member for pressing the reinforcement fiber having been impregnated with the resin against the supporting surface.

5. The treatment device according to claim 4, further comprising cooling means for cooling the pressing member.

6. The treatment device according to claim 4, wherein the pressing member presses the reinforcement fiber having been impregnated with the resin against the supporting surface with a predetermined pressing force.

7. The treatment device according to claim 4, wherein the pressing member is spaced a predetermined distance from the supporting surface.

8. The treatment device according to claim 2, further comprising heating means for heating the reinforcement fiber before impregnation with the resin.

9. The treatment device according to claim 1, wherein the pressing surface presses the reinforcement fiber against the supporting surface with a predetermined pressure.

10. The treatment device according to claim 1, wherein the pressing surface is spaced from the supporting surface via a predetermined gap therebetween.

11. The treatment device according to claim 2, wherein the pressing surface presses the reinforcement fiber against the supporting surface with a predetermined pressure.

12. The treatment device according to claim 2, wherein the pressing surface is spaced from the supporting surface via a predetermined gap therebetween.

* * * * *